Feb. 24, 1959    T. L. TALBERT    2,874,509
ANTI-SNAGGING DEVICE FOR FISHHOOKS
Filed Sept. 20, 1956
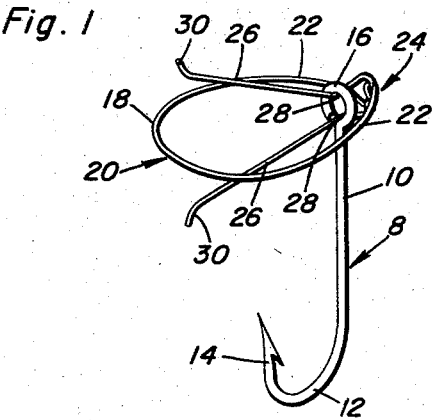
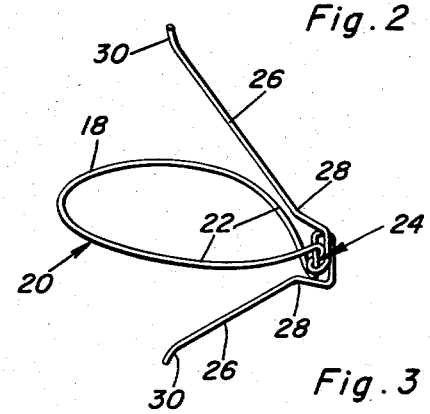
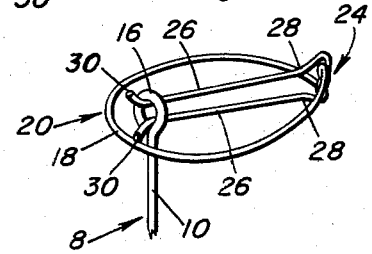
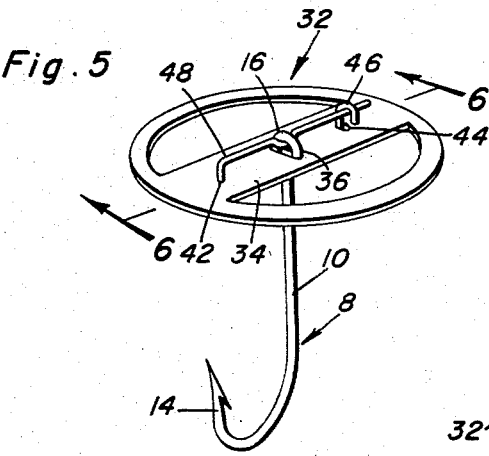
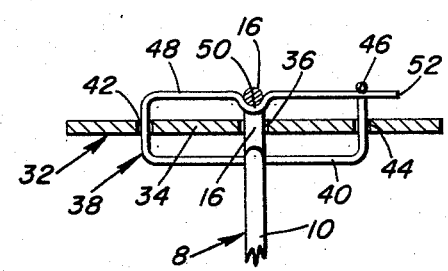
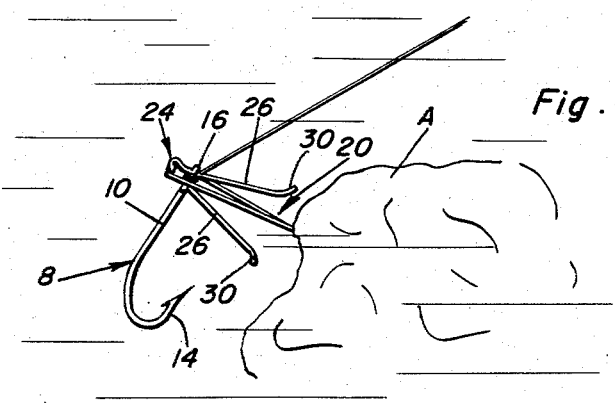
Thomas L. Talbert
INVENTOR.

United States Patent Office 2,874,509
Patented Feb. 24, 1959

2,874,509
ANTI-SNAGGING DEVICE FOR FISHHOOKS

Thomas L. Talbert, Slaton, Tex.

Application September 20, 1956, Serial No. 611,061

2 Claims. (Cl. 43—43.2)

This invention relates to a fishing device, broadly speaking, and has more particular reference to a device which is characterized by a conventional-type fish-hook and a novel attachment therefor which constitutes an anti-snagging guard for the barbed hook.

An obvious object of the invention is to provide a simple, practical, economical and reliable anti-snagging attachment which functions as a bumper-guard, and which if it is dragged or otherwise brought into line with logs, rocks and other obstructions, glances off the same and, in this manner, prevents the barbed hook from snagging and thwarting and perplexing the user of the fishhook.

The invention comprises a circular or ring-like guard which is either concentric or eccentric in respect to the shank of the hook and which is disposed in a plane at approximate right angles to the shank, has its peripheral portions projecting adequately beyond the axial center of the shank to achieve the desired deflecting results, and is mounted by readily usable means on the eye-equipped end of said shank.

Other objects, features and advantages will become more readily apparent from the following description and the accompanying sheet of illustrative drawings.

In the drawings:

Figure 1 is a perspective view of a fishhook equipped with an anti-snagging guard constructed in accordance with the principles of the present invention;

Figure 2 is a perspective view of the guard by itself;

Figure 3 is also a perspective view showing the fingers of the attaching means and how they are bent to avoid accidental detachment from the eye;

Figure 4 is a view illustrating how the guard is intended to strike and glance off an obstacle to diminish the likelihood of the barb becoming embedded therein;

Figure 5 is a perspective view showing a modified form of the invention; and

Figure 6 is a view in section and elevation on the line 6—6 of Figure 5.

Referring first to Figures 1 to 4 inclusive, the fishhook 8 (Fig. 1) is conventional and comprises a straight shank 10 with a return bend 12 at one end terminating in a pointed barbed hook 14. The customary line attaching eye 16 is at the opposite end of the shank. It is to this eye that the anti-snagging guard or attachment is readily and releasably connected. In the form of the invention seen in the figures under consideration, the guard is fashioned from a length of resilient wire, for example, a length of so-called banjo wire or wire called "Tonsillar wire." In carrying out the phase of the concept here under consideration it will be noticed (Figure 2) that the wire is bent upon itself between its ends as at 18 to form a loop-like or ring-like bumper-guard 20. This is approximately circular in plan and when it is applied it is at an approximate right angle to the lengthwise axis of the shank 8. The end portions 22 of the guard are crossed as depicted in Figure 2 and suitably inclined and twisted together as at 24 to complete the loop and to in addition enable one to transform the remaining intermediate and end portions of the wire into attaching and retaining fingers. These fingers are denoted at 26 and they somewhat overlie the guard itself and therefore extend at approximate right angles to the twisted portion 24 and then parallel to the guard itself. Being resilient, the inherent tendency of the wire is to spread the fingers apart into divergent relationship. The ends of the fingers adjacent the twisted portion are fashioned into bends 28 which constitute seats and accommodatingly and releasably engage the inner peripheral portion of the eye 16 as shown best in Figure 1. Thus the guard is snapped into place and held so that certain peripheral portions thereof project outwardly beyond the axis and occupy a position outwardly of the position of the barbed bill. Then, as shown in Figure 4 with the guard thus projecting, if the fishhook is moved in the path shown the guard bumps against and glances off the rock or other obstruction A. Consequently it causes the barbed bill to clear the obstruction and snagging is prevented; at least, the likelihood of snagging is reduced to a minimum. The free ends of the fingers are preferably bent laterally and away from each other as at 30 to the extent that they do not interfere with piloting the fingers through the eye when attaching the guard but, at the same time, constitute safety elements. That is to say they prevent the fingers from becoming accidentally disconnected from the eye under ordinary circumstances.

Basically, the form of the invention depicted in Figures 5 and 6 is much the same as that already described. However, the guard here is preferably constructed of commercial plastics and it is denoted by the numeral 32 and comprises a ring at right angles to the shank 10 and having a central spider 34 with a slot 36 permitting passage of the eye therethrough in the manner shown. The fastener in this case is similar to a safety-pin and is denoted generally by the numeral 38. The U-bar portion 40 is on one side of the spider and parallel to the same and the spider has spaced holes 42 and 44 with the opening 44 serving to permit passage of the keeper hook 46. The openable and closeable member 48 of the safety-pin has a bent portion 50 connectible with the eye 36 and the latch-like free end portion 52 is connected with the keeper hook 46. Thus, the spider carries what is in effect a safety-pin and the latter is releasably and conveniently connected to the eye 36 of the fishhook.

Experience has shown that a fishhook equipped with a simple and expedient bumper guard such as that disclosed herein protects the fishhook and minimizes the likelihood of the same snagging on weeds, sticks, debris, rocks and other objects, whereby the barbed hook is more effective and is free to effect a satisfactory and reliable catch.

Minor changes in shape, size, materials and rearrangement of parts which come within the spirit of the invention claimed may be resorted to in actual practice without departing from the spirit of the invention or the scope of the invention as claimed.

What is claimed as new is as follows:

1. An attachment for the eye-equipped end of the shank of a conventional-type fishhook having a shank and barbed bill comprising a bumper-guard ring-like in plan and adapted to assume a position in a plane which is at an approximate right angle to the lengthwise axis of the shank of a fishhook to which it may be attached, said guard being of an outside diameter such that the outer peripheral edge thereof will project a distance beyond the axis of the fishhook shank appreciably greater than the distance the barbed bill projects beyond the axis of said shank, said guard being provided with a central spider having apertures therein, one of said apertures being adapted to accommodate and permit passage therethrough of the eye on one end portion of the shank of the aforementioned fishhook, and a safety-pin-like fastener carried by said spider and having an openable and closable member adapted to pass through the shank's eye and which when it is fastened in closed position serves to detachably mount the guard on said eye in a position where it is at an approximate right angle to said shank.

2. An attachment for the eye-equipped end of the shank of a conventional-type fishhook having a shank and barbed bill comprising a bumper-guard ring-like in plan and adapted to assume a position in a plane which is at an approximate right angle to the lengthwise axis of the shank of a fishhook to which it may be attached, said guard being of an outside diameter such that the outer peripheral edge thereof will project a distance beyond the axis of the fishhook shank appreciably greater than the distance the barbed bill projects beyond the axis of said shank, said ring-like member being provided centrally with a spider, said spider being provided at its center with a slot and on opposite sides of the slot with apertures, a safety-pin-like fastener comprising a U-shaped portion the bight of which underlies the central portion of said spider, the lateral end portions extending through apertures provided therefor in said spider, said fastener having a latch-like free end portion parallel to the spider and above the top of the spider and releasably connected with the hook, said fastener being wholly carried by the spider, and a fishhook having a shank with an eye on one end, the eye passing through said slot and said latch-like member having a median portion passing through said eye.

References Cited in the file of this patent
UNITED STATES PATENTS

| | | |
|---|---|---|
| 2,522,292 | Modesto | Sept. 12, 1950 |
| 2,615,277 | Hayden | Oct. 28, 1952 |
| 2,703,945 | Johnson | Mar. 15, 1955 |
| 2,771,704 | Briggs | Nov. 27, 1956 |

FOREIGN PATENTS

| | | |
|---|---|---|
| 979,089 | France | Dec. 6, 1950 |